May 7, 1957
D. M. WILLYOUNG
2,791,707
DYNAMOELECTRIC MACHINE CONDUCTOR WITH
INTERNAL FLUID COOLING PASSAGES
Filed Dec. 28, 1954
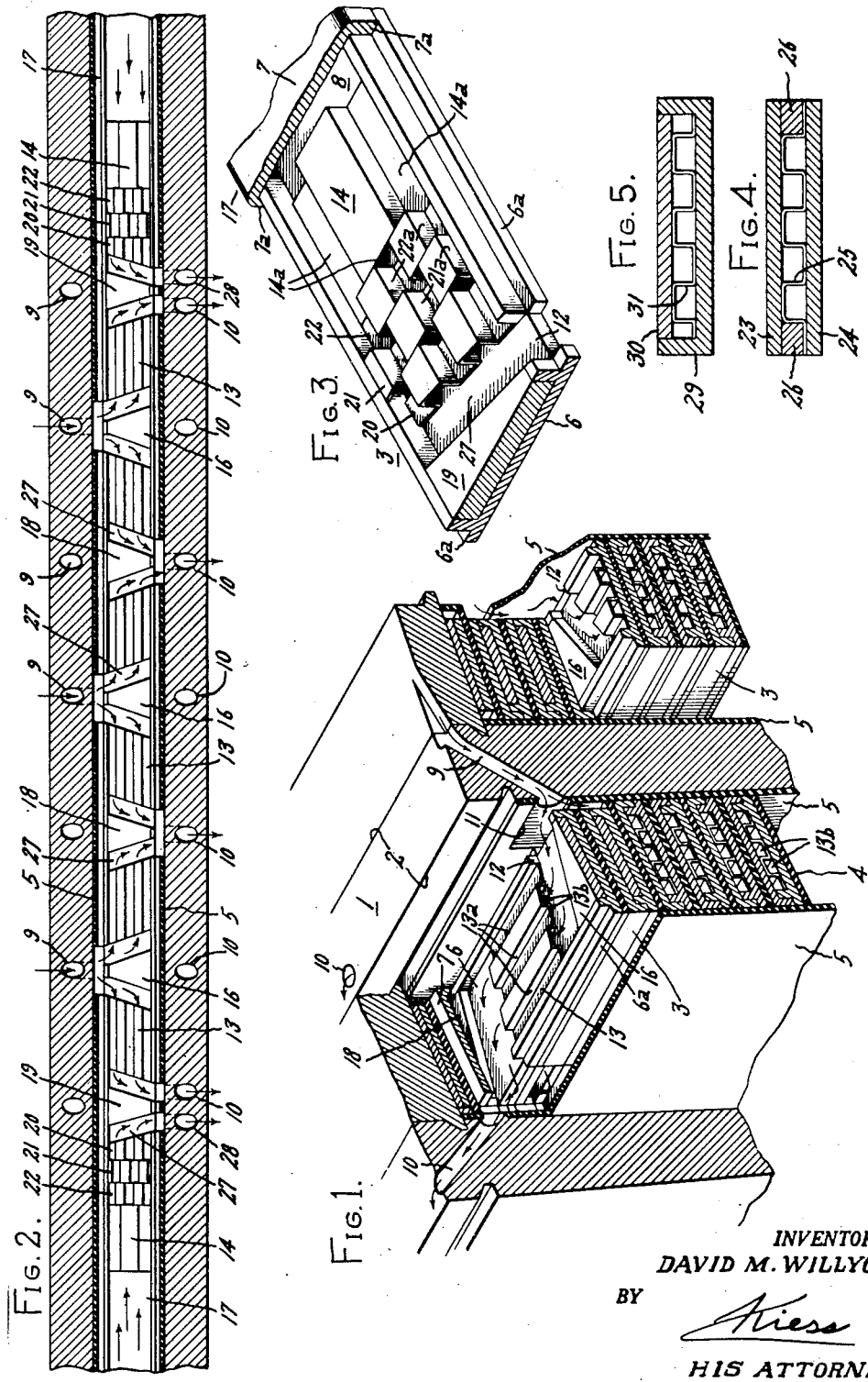
INVENTOR.
DAVID M. WILLYOUNG
BY
HIS ATTORNEY

United States Patent Office 2,791,707
Patented May 7, 1957

2,791,707

DYNAMOELECTRIC MACHINE CONDUCTOR WITH INTERNAL FLUID COOLING PASSAGES

David M. Willyoung, Scotia, N. Y., assignor to General Electric Company, a corporation of New York Application December 28, 1954, Serial No. 478,087

12 Claims. (Cl. 310—61)

This invention relates to dynamoelectric machines and more particularly to improvements in ventilating arrangements for windings in slotted rotor core members of large turbine generators.

Conventionally, generators used to supply large amounts of power employ a stationary outer magnetic core member having slots around the inner periphery containing a distributed armature winding adapted to provide alternating current power when excitation is provided by a rotor core member having slots containing a field exciting winding energized by direct current, when the rotor core member is rotated by a steam turbine or other prime mover. Power output obtainable from such a generator is related to the product of rotor excitation amperes and the number of turns in the rotor winding, as well as to the quantity of magnetic flux established in the field and armature circuits. The output may be increased by increasing the rotor excitation, provided that both the armature and field windings and other critical parts of the generator are cooled adequately to prevent temperatures from arising which are sufficient to damage the insulation or structural parts.

Heretofore, it has been known to use hollow conductor bars through which a coolant fluid is passed to cool the conductor bars to limit the temperature rise. The conductor bars may be fabricated in two pieces with one of them being an extruded section shaped to provide a plurality of passages therethrough. It can be appreciated that a plurality of comparatively small passages gives the best heat transfer relationship between the cooling gas and the copper conductor bars but at the same time increases the pressure required to force the coolant through the conductors.

The hollow conductor bars may be cooled by a fluid introduced into the passages within the conductors by one of two methods. In the so-called "fully end-ventilated" arrangement the rotor is cooled by gas introduced into the passages outside the end of the rotor core and forced axially therethrough until discharged in the central region of the rotor. However for long rotor cores, the amount of heat transported axially through the rotor into the central portion will produce a central heat concentration requiring rather high fan pressures and fan power to provide the requisite cooling flow.

An alternate arrangement to avoid this central temperature peak and high fan pressure and power employs the "gap pickup" principle, for instance as described in the application of Rollin H. Norris, Patent No. 2,702,870 issued February 22, 1955, and assigned to the assignee of the present application. The central region of the rotor winding is cooled by gas introduced from the "air gap" and forced through the ventilation passages within the coils by the rotational impact head of the rotor. This leaves only a relatively short length at each end of the rotor core which is cooled by gas introduced outside the slot enclosed coil portion, and carried axially inward a short distance and discharged in the manner similar to the "fully end-ventilated" arrangement described above.

It will be recognized that the design requirements for "fully end-ventilated" and "gap pickup" rotor windings are considerably different. In the former, the necessity of transferring large volumes of gas axially through the conductors in order to keep the central temperature peak within acceptable values results in high gas velocities in the axial passages within the coil, reasonably high heat transfer rates per unit of exposed surface, high fan pressure and relatively high fan pumping power. It is also noted that a large part of the total pumping pressure available is consumed in overcoming the frictional resistance of the axial passages themselves. Thus gas flow passages of relatively large size and low frictional drag, are essential in this design to avoid prohibitive pumping power and pressures despite the fact that the temperature difference between conductor and coolant or "surface rise" may be large since relatively little surface area is presented to the coolant through which to remove heat.

The "gap pickup" design on the other hand does not require a high pressure fan, and its necessary pumping power is much less. However, since it utilizes the relatively lower impact pressure head of rotor rotation it requires many short ventilation paths in parallel within the coil. When these short gas passages within the coil are arranged so the gas flows axially, the gas velocity within them will be much lower than for the "end-ventilated" arrangement discussed above since only a fraction of the cooling flow for the entire rotor passes through any given cross section. This lower gas velocity of course produces lower heat transfer rates per unit of exposed surface, but also results in a smaller portion of the total pressure drop along the flow circuit going towards overcoming the frictional resistance of the passages themselves and a greater portion going toward pressure drops associated with the inlet and outlet of the gas to and from the coil. Clearly therefore, this design obtains better results with many small ventilation passages since the total pressure resistance in the flow circuit is not greatly increased as the available area for gas passage is subdivided, while the increased surface area presented to the gas by the multiple passages substantially reduces the "surface rise" and, consequently, the total conductor bar temperature.

The conflicting design requirements for optimum performance of "end-ventilated" and "gap pickup" conductor sections heretofore have presented a complicating factor in the overall "gap pickup" rotor winding selection, since this conductor bar utilizes sections of each. The performance of the short "end-ventilated" sections is impaired if the gap pickup design is favored and vice versa.

Similarly, a design conflict arises in the selection of "end-ventilated" winding sections themselves whether they be the short end-ventilated sections of a gap pickup rotor or a "fully end-ventilated" conductor. The necessity for keeping the pumping pressure and power to a minimum dictates large passage sizes which expose insufficient surface area to the gas stream for low "surface rise."

In addition, the means heretofore employed for providing the many small passages within the conductors for optimum gap pickup performance, included machined or extruded conductor bars arranged so that two conductor bar members nested together make up a single conductor with a plurality of internal passages. Manufacturing limitations of the extrusion and machining processes prevent the passages from being less than a minimum size.

Accordingly, it is an object of this invention to provide a conductor in which different cross sectional passage arrangements for the "gap pickup" and "end-ventilated" portions of a gap pickup winding can easily be obtained.

A further object is to provide simple and practical means for securing smaller gas flow passages than are possible using presently available techniques.

Another object is to secure improved ventilation and heat dissipation means for use in dynamoelectric machine windings to allow the rating of a machine of given dimensions to be increased; the required dimensions for a machine of the same rating to be decreased; or the efficiency of a machine of the same size and same rating to be improved by utilizing less of the available space for ventilating means and more for active conductor material.

Other objects and advantages will become apparent from the following description taken in connection with the accompanying drawings, in which Fig. 1 is a sectional view in perspective of a portion of a turbine generator slotted rotor provided with conductor bar elements of a rotor winding constructed in accordance with the principles of the present invention, Fig. 2 is a plan view of a conductor bar which is cooled at its end portions by gas admitted outside the end of the slotted rotor core and flowing axially inward, and at its intermediate portions by gas received from gap pickup holes in the rotor surface, Fig. 3 is an enlarged portion in perspective of the inner portion of a conductor bar which is axially fed by a cooling medium and Figs. 4 and 5 are modifications of the conductor bar arrangements of Figs. 1, 2 and 3.

Generally stated, the invention is practiced by providing the conductor bars with inserted internal grid members, which may have altered dimensions from section to section axially along the conductor bar or may be omitted entirely at certain sections, so that there is found at various sections along the bar a variable, discretely changing amount of heat transfer surface area exposed to the coolant, so selected as to produce the optimum overall performance of the conductor bar as regards both coolant flow and temperature distribution.

Referring now to Fig. 1, the invention is disclosed in connection with a portion of a large turbine generator rotor comprising a ferritic core 1 which may be a large forging over 10 feet in length and 3 feet in diameter. The rotor is provided with axially extending winding slots 2 containing a rotor winding made up of superposed individual conductor bars 3, arranged in the slots and adapted to be energized in the conventional manner, such as through slip rings (not shown). The adjacent conductor bars are separated by relatively thin "turn insulation" 4 and in each slot the entire assembly of superposed bars 3 and intervening turn or strand insulation 4 is surrounded by slot or "ground" insulation 5, which is continuous around the sides and bottom walls of each slot.

In the arrangement shown in Fig. 1, the main body of the conductor bar 3 is made in two halves 6, 7 (see Fig. 3). The lower half 6 is substantially channel-shaped with extending flanges 6a. The upper half 7 is also channel-shaped and is adapted to fit over the channel portion of member 6 with its sides 7a abutting the flanges 6a. The two halves 6, 7 are assembled together to form therebetween a hollow chamber 8. To this chamber is supplied a coolant fluid, in which manner the copper conductor bar is cooled.

Referring again to Fig. 1, there is illustrated, in section, a structure by which coolant is supplied to the chamber 8 of the conductor bar if the rotor employs the "gap pickup" principle.

The core tooth portions (i. e. the rotor metal defining the winding slots) are provided with diagonal inlet and outlet ducts 9, 10 respectively. These inlet and outlet ducts extend obliquely through each tooth portion intermediate the winding slots, and each communicates at one end with the air gap formed between the rotor 1 and stator (not shown), and at its other end with the ground insulation 5. To get the cooling air into the conductor bars 3, holes 11 are punched in the ground insulation and the conductor bars are cut away as indicated at 12. As seen in Fig. 2, by way of example only, a plurality of diagonal inlet ducts 9 are provided and are axially spaced about 6 inches apart along each tooth; and intervening therebetween, for example at 3 inch intervals are a plurality of outlet ducts 10.

In the illustration shown in Fig. 1, the air flowing inwardly from the "air gap" end of the inlet ducts 9 is utilized to cool two conductor bars, but this is by way of example only since, depending upon the quantity of air available and the length of the distance between the air gap inlet and outlet, the number of conductor bars to be cooled can be varied.

In accordance with the present invention, a separately fabricated metallic (i. e. copper, aluminum) grid member 13 is disposed in chamber 8 of the conductor bar 3. The grid member 13 when located in the conductor bar defines a plurality of passages 13a through which the cooling gas flows. As shown in Fig. 1 the grid member defines a plurality of rectangular-shaped passages 13a. The number of these passages determines the amount of surface available for heat transfer, with grid surfaces effectively acting as internal heat transfer fins. It is obvious that the larger the number of surfaces 13b there are, the greater is the amount of surface available for cooling the conductor bar and the greater is the frictional resistance to flow. This grid member may be formed by conventional stamping, drawing, or roll forming processes which are relatively inexpensive. This type of construction puts no restrictions on the minimum sizes of the ventilation passages 13a formed by the grid member as previously was the case when limitations of the extrusion and machining processes used set the minimum passage width. Furthermore, it provides a simple means for varying the surface area exposed to the gas from section to section.

The grids can be secured in place by spot welding, soldering, or merely placed in position, relying on the centrifugal force of the assembly to maintain alignment and secure the contact pressure between grid and conductor required for minimum resistance to heat transfer.

In the arrangement shown, the gap pickup flow is directed across the width of the conductor and into the axial passages 13a by the insert 16. Corresponding inserts 18 direct it to the outlet ducts 10. The "gap pickup" and "end-ventilated" flow circuits are isolated from each other by the same type of inserts 19.

It can be appreciated by one skilled in the art that the difference between the conductor temperature in each section and the average gas temperature at that section varies inversely with the amount of effective heat transfer surface presented by the conductor to the coolant of that section and inversely as the "heat transfer coefficient," which is a measure of the effectiveness with which the coolant "scrubs away" the more or less stagnant boundary layer fluid film which builds up on the heat transfer surfaces and impairs the heat exchange. Also, the pressure drop required to force the coolant through the passages within any section will increase as the available gas area is subdivided and more heat transfer surface is exposed.

In the past, conductor bar assemblies have generally been formed by machining or extruding two mating conductor sections so that the assembled sections provide internal passages for coolant flow. The resulting conductor bar assemblies necessarily have the same passage cross sectional dimensions throughout their entire length.

Therefore, if the conductor passages were arranged so as to expose sufficient heat transfer surface area to the gas near the outlet section of the bar where the gas itself was hot, the same passage configuration would exist throughout the entire flow length thus requiring higher pressure and pumping power to force the specified amount of gas through the conductor bar than would be necessary in the arrangement described here. Otherwise, if the available pressure were fixed then the flow would be reduced unnecessarily producing a hotter conductor peak temperature than that obtained by the method herein described.

The end sections of the bar shown in Fig. 2 are ventilated by the improved method herein disclosed. At the outer end sections 17 of the bar 3, far from the gas outlets, there are no internal grids in the conductors. This is done to reduce the frictional pressure drop over this length. Naturally the temperature difference between the copper and gas is high, and this results in a total conductor temperature which is higher over this section than that which would prevail if the passage configuration at the inner end of the axial fed section 17 extended over the entire flow path length and the same quantity of gas were forced through. However, since the gas is cooler in the upstream section, the highest temperature along the conductor bar, or as commonly referred to as the "hot spot" of the conductor along section 17, can be arranged to be less than or equal to that at the gas outlet section so that the capability of the generator is in no way decreased. In fact, since the more effective heat transfer grid arrangement can be used at the outlet 28 of the axial fed section 17 than would be formerly tolerated, and since more gas flow will result from the improved flow condition near the inlet of the axial fed section, the "hot spot" can be reduced or the capability increased.

Figs. 2 and 3 show a conductor with no grid near the outer end 17 of the bar, a grid 14 of intermediate effectiveness at its intermediate section and grids 20, 21, 22 of high heat transferability at the end, where it discharges into the air gap. This process of grading the exposed heat transfer surface to give a more uniform winding temperature may be continued in as many steps as can be justified by the economics and requirements of the application. Evidently the benefits derived from use of the invention may be taken in many ways: lower "hot spot" temperature, decreased pumping pressure and pumping power required, greater generator capability, or any combination of these benefits. When the winding is "fully end-ventilated," these gains are particularly attractive when taken in the form of reduced pumping pressure and power.

Using heat transfer surfaces distributed in this manner by means of inserted grids produces a more uniform winding temperature. This in turn results in a still further increase in generator capability since, by raising the conductor temperature near the upstream end of the gas flow path 17, the temperature gradient between the conductors and the rotor iron is increased, causing more heat to flow through the ground insulation. All such heat as can be shunted from the conductor in this way reduces the heat content and temperature of the gas accordingly, thus lowering the conductor hot spots.

It will be recognized that although these features of the inserted grid construction have been described in connection with the "end-ventilated" sections of the "gap pickup" type of ventilated rotor, they apply equally well, and in fact may provide even more gain, when applied to a "fully end-ventilated" rotor with no gap pickup cooling; and the scope of this invention is intended to cover such an arrangement as well.

The grid construction used in the "end-ventilated" sections, may also be incorporated in the "gap pickup" type of ventilation systems. However, the coolant flow path length in these circuits is usually so short that axial heat transfer within the conductor bar keeps the ratio of maximum to average temperature small. Also, the frictional pressure drop in the ducts themselves is not large, so that it is more practical to use the same grid section 13 over the full length of the ventilating passages in a "gap pickup" type of system.

Previously, when the conductor bars were extruded or machined to obtain the same cross section shape over the full conductor bar length, it was difficult to secure a design that performed adequately for both the "end-ventilated" sections of the conductor bars and for the "gap pickup" sections, without shortening the "end-ventilated" length excessively or using an additional blower. This resulted from the fundamental reasons already discussed making it desirable to favor small passages in the "gap pickup" sections and large passages in the end sections. These difficulties are eliminated by using my inserted grid construction, which permits the conflicting design requirements to be reconciled.

Another design restriction which is removed by the use of my inserted grids is the restriction as to minimum coolant passage width. With the previously used conductor bars, a plurality of longitudinally extending ribs, machined or extruded integral with the bar, divided the gas space into several smaller passages to increase the heat transfer area. However, the restrictions imposed on the construction by the extrusion process, and the minimum size milling cutter that could be effectively used to machine the cross flow path 27, prevented the use of passages smaller than a certain minimum size. The use of the heat transfer grids in accordance with the present invention avoid this problem, since they will merely be cut to appropriate length and inserted in the conductor bar as required, thus eliminating extensive machining on the grid sections themselves. Thus with this type of grid arrangement there can be more copper in the conductor bar and there is more surface area to carry the heat away by convection.

Fig. 3 illustrates the versatility of these heat transfer grids. It is well known that the heat transfer between a cooling fluid and the adjacent metal to be cooled is reduced by the "boundary layer" of stagnant or slow-moving fluid which is established adjacent the metal surface. It is also known that with fluid flowing axially in the duct, the thickness of this boundary layer is small close to the coolant inlet and increases as the fluid moves downstream, achieving shortly a stabilized thickness. It has been found that the heat transfer is much more effective in this short entry region, before the boundary layer thickness has "stabilized" at its maximum value. By use of my differently shaped grid members, a number of grids can be inserted in the conductor in a way which will break up the boundary layer developed.

To accomplish this, a series of copper grids indicated at 20, 21, 22 are located in the chamber 8 of the conductor bar. The passages formed by grids 20 and 22 are not in line with the passages formed in grid 21. With this arrangement, it is apparent that the gas flowing in passages 14a (Fig. 3) impinges on the leading edges of the first grid 22, tending to "scrub" the boundary layer from the surfaces 22a of grid 22. Similarly, the gas flowing in the passages defined by grid 22 will impinge on the edges of the next grid 21, tending to scrub the boundary layer from surfaces 21a. Thus the boundary layer on the grids is successively broken up and a new boundary layer is formed after each transition. By providing a series of such short staggered grids, the boundary layer can be kept relatively thin and heat transfer thus substantially increased. Since the allowable grid length between each transition is short for this arrangement, an economical method of manufacture is to utilize a stamping operation to form the offset grids in a continuous length in one operation.

In Fig. 4, there is shown a modified form of construction of a conductor bar using insertable grid members. This bar is formed of two main conductor members 23, 24 of plain flat strip stock, with the insertable copper grid member 25 located therebetween. The grid is prevented from buckling by insertion of rectangular wire members 26 located between the bars 23, 24. To maintain the grid 25 in position relative to the bars 23, 24, they may be spot-welded in place. The wires 26 are shown as located at the edge portions of the copper bar, but this is by way of example only since they can be located wherever desirable to give the maximum support against crushing of the grids.

Fig. 5 illustrates still another modification, in which the conductor bar is formed of an extruded channel-shaped member 29 and a flat bar 30. The grid members 31 are located within the channel section 29 and secured thereto. The bar 20 may then be secured in place by suitably brazing or soldering the strip 30 to the edges of the channel 29.

Thus it can be seen that the invention provides insertable grid members disposed in hollow conductor bars to provide better heat transfer between the cooling gas and the conductor bar. With this arrangement the rating of a machine of given dimensions can be increased, or the required dimensions for a machine of the same rating can be decreased. The efficiency of a machine of the same size and same rating may be improved by uitilizing less of the available space for ventilating means and more for active conductor material.

While a number of modifications of the invention have been described in detail herein, it will be obvious to those skilled in the art that manw changes and substitutions of equivalents might be made. It is, of course, desired to cover by the appended claims all such modifications as fall within the true spirit and scope of the invention.

What I claim as new and desire to secure by Letters Patent of the United States is:

1. An internally cooled electrical conductor bar comprising at least two main bar portions secured together to define a longitudinally extending chamber with at least one coolant inlet and at least one longitudinally spaced outlet, grid means disposed in said chamber with portions in heat transfer relation with said main bar portions and defining a plurality of longitudinally extending coolant passages, the grid means including members nearest the coolant inlet defining a comparatively few passages of relatively large cross section area, and succeeding downstream grid members defining a larger number of smaller coolant passages for increased heat transfer area as the coolant approaches the outlet.

2. An internally cooled electrical conductor bar in accordance with claim 1 in which the conductor bar is constructed of two flat bars with the grid means inserted therebetween, and spacer wires disposed between one of the bars and the grid to prevent the grids from being buckled.

3. An internally cooled electrical conductor bar in accordance with claim 1 in which the conductor bar is constructed of an extruded channel shaped member and a flat bar secured to said channel member to define the chamber in which the grid means are disposed.

4. An internally cooled electrical conductor bar in accordance with claim 1 in which the grid means comprises a plurality of axially spaced grid members, the alternate ones being disposed in staggered relation to the adjacent grids whereby fluid flowing through the passages defined by one grid impinges on the leading edge of the gas contact walls of the next grid, whereby the boundary layer is broken up and a new boundary layer is caused to be formed on each succeeding grid.

5. An internally cooled electrical conductor bar in accordance with claim 4 in which the grid members are of short axial length to prevent a susbtantial boundary layer from being built up between the coolant and the grid.

6. A dynamoelectric machine rotor core member having winding slots, main slot insulation arranged adjacent the walls of each of said slots, a winding disposed in said slots and comprising in each slot superposed conductor bars, the conductor bars defining axial passages adapted to receive a cooling medium, the core member having a central portion defining outlet passages for the cooling medium, which outlet passages are in communication with said axial passages, conductive grid means disposed in and extending over a portion of the axial passages in the conductor bars in heat transfer relation therewith, the grid means defining a plurality of relatively small axial passages exposing a large heat transfer surface area to the cooling gas for reducing the temperature of the conductor bars.

7. A dynamoelectric machine rotor core member having winding slots, main slot insulation arranged adjacent the walls of each of said slots, a winding arrangement in said slots and comprising in each slot superposed conductor bars, each constructed of two substantially channel-shaped sections secured together to define an axial passage adapted to receive a cooling medium, openings defined by the conductor bars at a center portion of the rotor, the core member also defining outlet passages in communication with the passages in the conductor bars and adapted to vent the cooling gas flowing through the conductor bars, grid means disposed in a central portion of the axial passages of the conductor bars and comprising a series of grid members of short axial length and defining passages which are in staggered relation to each other whereby the boundary layer is interrupted at the downstream end of each grid, the grid members nearest the center of the rotor defining a plurality of relatively small axial passages while the axial passages defined by the grid members located further from the center of the rotor are larger in cross-sectional area, whereby there is increased heat transfer surface exposed to the cooling medium as it approaches the center of the rotor.

8. A dynamoelectric machine rotor member having winding slots defining tooth portions therebetween, main slot insulation arranged adjacent the walls of each of said slots, a winding arrangement in said slots and comprising in each slot superposed conductor bars defining axial passages for the flow of cooling medium therein, the end portions of said conductor bars being adapted to receive a cooling medium, the rotor member defining passages connecting with the end portions of the conductor bar to vent the cooling gas after it has passed therethrough, means for providing axially spaced ventilating ducts on each side of the conductor bar inside said main slot insulation inwardly of the end portions and communicating with the passages defined by at least one of said conductor bars, means for cooling the central portion of the rotor member including diagonal inlet ducts passing through the tooth portions from the periphery of the rotor to the ventilating ducts within said slot insulation on the first side of said groups of bars for admitting cooling fluid thereto, and diagonal outlet ducts passing through the tooth portions from the ventilating ducts on the second side of said groups of bars to the periphery of the rotor for exhausting the cooling gas, grid members located in said axial passages in heat transfer relation with the conductor bars between said inlet and outlet ducts, said grid members defining a plurality of parallel longitudinally extending coolant passages, and heat transfer grid means disposed in the end portions of said bar.

9. A dynamoelectric machine rotor assembly in accordance with claim 8 in which the grid means located in the end portions of the conductor bars comprises a plurality of axially spaced grid members each defining axial passages which are out of alignment with the passages of adjacent grid members, whereby the boundary layer of cooling gas adjacent the heat transfer surfaces of the bars and grids are broken up at the downstream end of each grid.

10. A dynamoelectric machine rotor assembly in accordance with claim 8 in which the grid members located in the end portions of the conductor bars are of short axial length with the axial passages decreasing in cross-sectional area in successive grid members in the downstream direction, whereby there is an increasing amount of heat transfer surface available to the cooling medium.

11. A dynamoelectric machine core member having winding slots, main slot insulation adjacent the walls of each of said slots, a winding disposed in each slot and comprising superposed conductor bars, each bar defining at least one longitudinal passage for a coolant fluid, and separately fabricated grid members of heat conductive material disposed in said longitudinal passages and having portions in good heat transfer relation with the conductor and other portions constituting extended heat transfer surfaces and dividing the coolant passage into a plurality of parallel longitudinal passages.

12. In a dynamoelectric machine core member having winding slots defining therebetween tooth portions of said core, main slot insulation arranged adjacent the walls of each of said slots, a winding arranged in said slots and comprising in each slot superposed groups of bars defining axial passages for the flow of cooling medium, means defining axially spaced radial ventilating ducts at each side of the conductor bars inside said main slot insulation and communicating with at least one of said axial passages, means including diagonal inlet ducts passing through the tooth portions from the periphery of said core to the radial ducts within said slot insulation on the first side of said groups of bars for admitting cooling fluid thereto, means including diagonal outlet ducts passing through the tooth portions from radial ducts at the second side of said groups of bars to the periphery of said core for exhausting cooling fluid, and grid members located in said axial passages and having portions in good heat transfer relation with the conductor bars between said inlet and outlet ducts, said grid members defining a plurality of parallel longitudinally extending coolant passages.

References Cited in the file of this patent

FOREIGN PATENTS

| | | |
|---|---|---|
| 654,087 | Germany | Dec. 10, 1937 |
| 691,191 | Germany | May 25, 1940 |